United States Patent [19]

Dick et al.

[11] 4,121,022

[45] Oct. 17, 1978

[54] POLY (2-HYDROXYETHYLMETHACRYLATE) MEMBRANES FOR ELECTROCHEMICAL USE

[75] Inventors: Richard Dick, Paris; Georges Feuillade, Arpajon; Robert Gadessaud, Massy Palaiseau; Louis Nicolas, Neuilly sur Seine, all of France

[73] Assignees: Compagnie Generale d'Electricite, Paris Cedex; Institut National de Recherche Chimique Appliquee Ircha, Paris, both of France

[21] Appl. No.: 860,410

[22] Filed: Dec. 13, 1977

[30] Foreign Application Priority Data

Dec. 13, 1976 [FR] France ............................... 76 37503

[51] Int. Cl.$^2$ ............................................. H01M 6/04
[52] U.S. Cl. ..................................... 429/204; 429/249
[58] Field of Search ............... 429/249, 250, 253–255, 429/204

[56] References Cited

U.S. PATENT DOCUMENTS

| 2,858,353 | 10/1958 | Mendelsohn | 429/249 |
| 3,955,014 | 5/1976 | Moster et al. | 429/253 X |

FOREIGN PATENT DOCUMENTS

| 750,498 | 1/1967 | Canada | 429/249 |

*Primary Examiner*—Charles F. LeFevour
*Attorney, Agent, or Firm*—Sughrue, Rothwell, Mion, Zinn and Macpeak

[57] ABSTRACT

The invention relates to a semi-permeable membrane for lead acid batteries. The membrane has a microporous structure comprising a first polymer and a second polymer closely mixed together, the first polymer being poly (2-hydroxyethylmethacrylate), known as reticulated poly HEMA, characterized by the fact that the second polymer comprises one polymer or a mixture of several different polymers chosen from among polyoxyethylene glycol, polyvinylpyrrolidone, polyacrylic acid, polymethacrylic acid, copolymers of acrylic and methacrylic acid, polyacrylates and polymethacrylates of alkyl, and the copolymers of the acrylates and methacrylates of alkyls.

8 Claims, No Drawings

POLY (2-HYDROXYETHYLMETHACRYLATE) MEMBRANES FOR ELECTROCHEMICAL USE

The present invention relates to the preparation of poly (2-hydroxyethylmethacrylate) membranes which can be used as ion separators in mediums in which there are electrochemical reactions taking place, in particular in lead-acid storage cells. It also relates to membranes made by method of preparation.

The diffusion of antimonyl $SbO^+$ ions coming from the corrosion of the electrode grids, from the positive $PbO_2$ to the negative Pb, causes the deposit of antimony on this latter electrode, this having the effect of reducing the charge efficiency of the storage cell by lowering the polarisation of the hydrogen. The result of this is a reduction of the performance of the cell, mainly of its storage life.

The presence of antimony, in a concentration of 4% to 6% in the composition of the electrode grids is partially motivated by the need to obtain good fluidity in casting as well as a sufficient hardness of the Pb–Sb alloy after solidification. However, the replacement of antimony by calcium, at ratios lying between 0.065 and 0.090% has not made it possible to solve all these problems, since besides its mechanical action mentioned above, antimony plays a complex electrochemical part in the operation of the active material ($PbO_2$), in particular it enables the $\alpha$ variety of $PbO_2$ to pass to the $\beta$ variety of $PbO_2$ which is more divided and active. The problem of the confinement of the antimony in the positive compartment therefore still remains hence the advantage of being able to have membranes available which are selective with respect to $SbO^+$, the stable form of antimony in a highly acid oxidising medium ($H_2SO_4$ at 9N).

The majority of work on the electrolyte of lead-acid cells has generally been on other aspects of the function of the separators (chemical resistance, immobilization of the electrolyte and electric conductivity), the selective screen function appearing only secondarily.

The work on porous separators (charged or uncharged PVC) which is the subject of the article "Role et utilisation des membranes en electrochimie et en electrotechnique" by G. Feuillade and M. Jacquier in Entropie, 49 (January, 1973), p 21, and of the article "Dic Wirkung von Separatoren auf die Antimonwanderung in Bleibatterien" Electrochim. Acta (1965), 9, p 55 by Zehende, Hermann, and Leibssle or on gelled electrolytes which are the subject of the article "Battery Materials" — Noyes Data Corp. (1970), p 7, 24 104 by P. Conrad has generally developed on these lines and a systematic search for selective separators with very fine micro porosity has been practically non-exisent. Even research workers concerned with transfer of antimony have considered only porous separators which only have tortuosity effects that are strictly geometrical.

It is therefore important to know how to prepare non-porous membranes or membranes with very fine microporosity whose separation effect is due to highly selective chemical or ionic interactions and through which $H^+$ ions pass preferably by dissolution and by diffusion rather than by viscous flow. Since these membranes must have a relatively long service life in the medium considered, it is necessary that the polymer used for their preparation should resist well acid hydrolysis and oxidation.

Further, these membranes must have sufficient mechanical properties, both in the dry state and in the wet state, for them to be easily handled without danger of tearing during their transfer in the acid medium. This is why it is particularly interesting to know how to prepare membranes supported by a macroporous unit made of polypropylene, polyvinyl chloride, fibre glass or another resistant material.

The invention relates mainly to poly (2-hydroxyethylmethacrylate) (in short poly-HEMA) membranes, and to a method of producing them. They are intended for the use described hereinabove and preferred embodiments have the following properties:

A very finely microporous structure in which the average diameter of the pores is less than twenty or so Å. This structure is characterized in that it allows the $H^+$ ions and consequently electric current to pass through the membrane, while stopping the passage of the $SbO^+$ ions which are responsible for the reduction of the charging efficiency of the cell. More precisely, this structure is such that the electrical resistance of the membrane, immersed in a 9N aqueous solution of $H_2SO_4$ is less than 150 m$\Omega$/cm$^2$ and that the permeability of the membrane to $Sb_2O_3$ remains less than 0.1 mg/cm$^2$ - hour.

High chemical stability allowing the membranes to resist acid hydrolysis and oxidation and to maintain their electrical conductivity and their selectivity with respect to the $SbO^+$ ions for a long time.

A relative insensitivity to temperature allowing the membranes to keep their mechanical properties in a temperature range lying between - 20° C. and 70° C.

Strong adhesion to a macroporous support whose function is to support the membranes and to make them easy to handle. The membrane and the support form, in these conditions, a composite membrane whose mechanical properties (flexibility, breaking strength, etc.) are generally greater than those of the membrane and of the support considered separately.

The invention provides a semi-permeable membrane with a microporous structure comprising a first polymer and a second polymer intimately mixed together, the first polymer being poly (2-hydroxy-ethylmethacrylate) called reticulated poly HEMA, wherein the second polymer comprises one polymer or a mixture of several different polymers chosen from among the following substances: polyoxyethylene glycol, polyvinylpyrrolidone, polyacrylic acid, polymethacrylic acid, copolymers of acrylic or methacrylic acid, polyacrylates and polymethacrylates of alkyls, and copolymers of acrylates and methacrylates of alkyls.

The invention also provides a method of production of such membranes.

Other advantages of the method in accordance with the invention and of the membranes which are thereby formed will become apparent from the following description, given by way of purely illustrative examples.

Membranes in accordance with the invention are prepared by polymerising, at ambient temperature or at a temperature higher than ambient temperature, by a photochemical method, the 2-hydroxyethylmethacrylate (in short HEMA) in the presence of a plasticizer and of a soluble polymer, or better of a mixture of a soluble polymer and of an insoluble polymer in a medium formed by an aqueous solution of 9N $H_2SO_4$. The presence of the plasticizer makes the structure of the membranes more slack, due to the increase in the intermolecular distances of the poly-HEMA chains and of the reduction of the reticulation number. The result of this is a better electrical conductivity of the membrane. The presence of the plasticizer is also necessary to impart elasticity and resilience to the membrane which would otherwise be brittle in the dry condition. The addition of a polymer to the HEMA solution increases its viscosity and thus makes it possible to use the usual technique for the production of membranes, which consists of applying the solution on a plane support by means of a knife. The presence of a polymer further facilitates the polymerisation of the HEMA in a thin layer of 50µ to 200µ thick.

In the case where the polymer added to the HEMA solution is soluble in 9N aqueous $H_2SO_4$, it can diffuse partially on the outside of the membrane and increase its porosity and consequently its electrical conductivity.

However, this membrane cannot diffuse totally on the outside of the membrane, since the HEMA has a tendency to interpolymerise with it and to graft onto it during the irradiation by ultra-violet rays. The presence of this polymer in the membrane nevertheless allows the electrical conductivity of this membrane to be increased because it increases the expansion rate of the membrane.

In the case where the polymer added to the HEMA solution is insoluble in the 9N $H_2SO_4$ aqueous solution, the polymer remains completely in the membrane. Therefore, this polymer should be chosen among those which make it possible to increase the mechanical strength and the chemical stability of the membrane. This polymer should be chosen preferably from among those which increase the adhesion of the membranes to the reinforcing supports used (polypropylene felts or fibre glass felts).

The incorporation in the HEMA solution of a mixture of these two types of polymers makes it possible to impart to the membrane simultaneously acceptable electrical conductivity and good chemical stability. According to the composition of the mixture of these two types of polymers, one or the other of the properties mentioned is preponderant.

The following plasticizers, used alone or mixed, are suitable for the preparation of membranes in accordance with the invention:

dihydric alcohols, such as ethylene glycol, propylene glycol, trimethylene glycol, diethylene glycol, triethylene glycol or polyoxyethylene glycols;

Trihydric alcohols such as glycerol of triethanolamine; and 2-pyrrolidone or methylpyrrolidone.

The proportion of plasticizer added to the HEMA lies between 5% and 40% by weight with respect to the HEMA.

Among the polymers which it is interesting to add to the plasticizing HEMA mixture for the reasons set forth hereinabove, the distinction should be made between those which are soluble in the 9N aqueous $H_2SO_4$ medium and those which are insoluble in this medium. The following polymers come within the first category:

polyoxyethylene glycol and polyvinylpyrrolidone.

The following polymers come with the second category:

polyacrylic and polymethacrylic acids, copolymers of acrylic acid and of methacrylic acid, and alkyl polyacrylates and copolymers of alkyl acrylates and methacrylates.

The proportion of polymer which it is recommended should be added to the HEMA lies between 1% and 30% by weight.

As photosensitive promoters, use can be made of uranyl salts such as uranyl nitrate and uranyl acetate, organic compounds such as benzoin, sodium p-toluene sulfinate, in the presence of methylene blue, sodium anthraquinone-2-sulfonate and others.

To reinforce the membrane, a felt or a very permeable fabric is used which is made of a material resistant to the action of $H_2SO_4$ and of oxygen. In some cases, it can be an advantage to be able to prepare these membranes so that the greater part of the poly HEMA will be situated on one side of the felt or of the fabric. More precisely, the reinforced membrane must have a thin microporous film of poly HEMA on one surface and a macroporous layer mostly constituted by the felt or the fabric on the other surface. Such a disposition can be obtained as follows:

The felt or the fabric is deposited on a sheet of TEFLON or of TERPHANE which itself covers a suction support. The felt or the fabric is then impregnated with the HEMA solution by means of a brush or of a roller preferably made of silicone rubber). The solution is allowed to diffuse for a few minutes towards the surface of the felt or of the fabric which is in contact with the TEFLON sheet, before exposing the whole to ultraviolet radiations. To facilitate the impregnation of the felt, the HEMA solution can be diluted in a volatile solvent such as methanol, ethanol, acetone and others. If on the contrary the membrane is required to be distributed evenly in the felt or the fabric, a solution having higher viscosity is used and the impregnated felt or fabric is exposed to ultraviolet radiation immediately after its impregnation so that the solution cannot gather together at the felt-TEFLON or fabric-TEFLON interface.

Another method making it possible to obtain the above-described structure, which comprises at least two layers, consists in spreading by means of an applicator a fairly thick HEMA solution on a TERPHANE sheet covering a suction support and in laying the felt on the layer thus formed. Due to the high viscosity of the solution, the felt penetrates only partially into the solution. The whole is then exposed to ultra-violet radiation. If the viscosity of the solution is reduced, the felt or the fabric enters more deeply into the solution and thus, after polymerisation of the HEMA, a more uniform distribution of the membrane is obtained inside the felt or fabric.

It is important for the membrane to adhere to the filter or to the fabric. It is observed that the adhesion decreases with an increase in the concentration of soluble polymer in the 9N $H_2SO_4$ added to the HEMA. The limiting concentration which is not to be exceeded depends on the molecular mass of the polymer.

The electrical resistance of the membranes which are mentioned in the examples hereinbelow was measured as follows:

A sample of membrane was placed between two compartments of a measurement cell filled with a 9N aqueous $H_2SO_4$ solution and the difference in potential between the two surfaces of the membrane was measured as a function of the current which was passing through the membrane. The resistance determined in the same way when there is no membrane was subtracted from the resistance thus obtained. The DC injection electrodes were made of lead and the electrodes used for measuring the difference in potential between the two surfaces of the membrane were made of mercury and mercurous sulfate.

The permeability of the membranes to the $Sb_2O_3$ was measured as follows:

A sample of membrane was placed between the two compartments of a cell one of whose compartments contained a 9N aqueous solution of $H_2SO_4$ saturated with $Sb_2O_3$ and the other of whose compartments contained a 9N aqueous $H_2SO_4$ solution. The quantity of $Sb_2O_3$ which penetrated into this compartment was determined by periodic drawing off of a small quantity of the solution and by dosing of the $Sb_2O_3$ by means of potassium iodide-ascorbic acid reagent. This reagent turns yellow in the presence of trivalent antimony. The intensity of this colouring was determined with an ultraviolet spectrophotometer, in accordance with the method described by A. Elklind, K. H. Gayer and D. F. Boltz, in Analytical Chem. Vol. 25 n° 11 (1953 1744).

EXAMPLE 1

A solution having the following composition was used:
84% HEMA;
10% Glycerine;
4% PRIMAL AC 34 (ROHM and HAAS acrylate-methacrylate copolymer; and
2% Uranyl nitrate.

This solution was applied by means of an applicator on a plane surface (for example a suction support) covered with a TERPHANE sheet (ethylene polyterephthalate) and the layer of solution thus obtained was exposed for 2 to 5 minutes to ultraviolet radiation from a mercury vapour and metallic iodide lamp (PHILIPS HPM 12, 400 watts) placed at a distance of about 30 cm from the surface. Five to ten minutes after this exposure, the membrane was unstuck from the TERPHANE sheet. Its thickness was 160 microns.

After immersion for 48 hours in a 9N aqueous $H_2SO_4$ solution, the membrane had an electrical resistance of 140 m$\Omega$/cm$^2$ and a permeability to $Sb_2O_3$ of 0.026 mg/h-cm$^2$.

After immersion for 97 days in a 9N aqueous solution of $H_2SO_4$ maintained at 65° C. with oxygen bubbling through it, the electrical resistance of the membrane was 95 m$\Omega$/cm$^2$ and its permeability to $Sb_2O_3$ was 0.028 mg/h-cm$^2$.

EXAMPLE 2

A membrane was prepared whose thickness was 200 microns in accordance with the method set forth in example 1 using a solution whose composition was as follows:
78% HEMA;
18% Ethylene glycol;
3% PRIMAL AC 34; and
1% Uranyl nitrate.

After two days of immersion in a 9N aqueous solution of $H_2SO_4$, the membrane had an electrical resistance of 130 m$\Omega$/cm$^2$ and a permeability to $Sb_2O_3$ of 0.013 mg/h-cm$^2$.

After immersion for 47 days in a 9N aqueous solution of $H_2SO_4$ maintained at 65° C, with oxygen bubbling through it, the electrical resistance of the membrane was 95 M$\Omega$/cm$^2$ and its permeability to $Sb_2O_3$ was 0.015 mg/h-cm$^2$.

EXAMPLE 3

A membrane with a thickness of 200 microns was prepared in accordance with the method set forth in example 1, using a solution whose composition was as follows:
75% HEMA;
21% Ethylene glycol;
3% PRIMAL AC 34; and
1% Uranyl nitrate.

After two days immersion in a 9N aqueous $H_2SO_4$ solution, the electric resistance of the membrane was 112 m$\Omega$/cm$^2$ and its permeability to $Sb_2O_3$ was 0.014 mg/h-cm$^2$.

After immersion of the membrane for 47 days in a 9N aqueous solution of $H_2SO_4$ maintained at 65° C. with oxygen bubbling through it, the said magnitudes are respectively 82 m$\Omega$/cm$^2$ and 0.014 mg/h-cm$^2$.

EXAMPLE 4

In accordance with the method set forth in the Example 1, a membrane was prepared which had a thickness of 150$\mu$, using a solution whose composition was:
68% HEMA;
10% Polyoxyethylene glycol of molecular weight 15,000;
1% PRIMAL AC 34;
20.3% Ethylene glycol; and
0.7% Uranyl nitrate.

The electrical resistance of the membrane was 80 m$\Omega$/cm$^2$ and its permeability to $Sb_2O_3$ was 0.040 mg/h-cm$^2$.

EXAMPLE 5

A solution having the following composition was prepared:
69% HEMA;
29% Ethylene glycol;
1% Polyoxethylene glycol having a molecular weight of 2000; and
1% Uranyl nitrate.

A polypropylene felt (VILEDON L 32237 F thickness 200$\mu$) was impregnated with this solution so that a mass of 24 grams of this solution is spread out over an area of 120 cm$^2$ of felt. For the solution to be distributed homogenously, it was diluted with ethanol. Impregnation was effected in accordance with the method described hereinabove.

The thickness of the reinforced membrane obtained after the impregnated felt had been exposed for a few minutes to ultraviolet radiation was 290 microns. Its electric resistance was 155 m$\Omega$/cm$^2$ and its permeability to $Sb_2O_3$ was 0.048 mg/h-cm$^2$.

EXAMPLE 6

A solution having the following composition by weight was prepared:
68.2% HEMA.
25.7% Ethylene glycol;
5.5% PRIMAL AC 34; and
0.6% Uranyl nitrate.

This solution was spread by means of an applicator on a plane suction support covered with a TERPHANE sheet. Thus, a layer having an equal thickness of about 200 microns was obtained on which a polypropylene felt (VILEDON L23237 F) was laid which penetrated partially into the solution. The whole was then exposed for a few minutes to ultra-violet radiation as described in example 1.

The total thickness of the reinforced membrane after polymerisation of the HEMA was 280 microns. The electrical resistance and the permeability to $Sb_2O_3$ of the membrane were respectively 95 m$\Omega$/cm$^2$ and 0.087 mg/h-cm$^2$.

After an immersion of the membrane for 41 days in a 9N aqueous solution of H$_2$SO$_4$ maintained at 65° C. with oxygen bubbling through it, the preceding characteristics become respectively 70 m$\Omega$/cm$^2$ and 0.075 mg/h-cm$^2$.

It must be understood that the invention is is no way limited to the examples described, but that it covers on the contrary all variants thereof.

What is claimed is:

1. A semi-permeable membrane with a microporous structure comprising a first polymer and a second polymer intimately mixed together, the first polymer being reticulated poly (2-hydroxyethylmethacrylate), wherein the second polymer comprises one polymer or a mixture of several different polymers chosen from among the following substances: polyoxyethylene glycol, polyvinylpyrrolidone, polyacrylic acid, polymethacrylic acid, copolymers of acrylic or methacrylic acid, polyacrylates and polymethacrylates of alkyls, and copolymers of acrylates and methacrylates of alkyls.

2. A membrane according to claim 1, wherein its microporous structure is obtained by immersion in an electrolyte such as 9N aqueous H$_2$SO$_4$ of a film whose composition by weight is as follows:

50 to 90% of poly HEMA;

5 to 40% of plasticizer for the poly HEMA, chosen preferably from among the following substances: ethylene glycol, propylene glycol, trimethylene glycol, diethylene glycol, triethylene glycol, polyoxyethylene glycol, glycerol, 2-pyrrolidone, and methylpyrrolidone; and 1 to 30% of a second polymer or of a mixture of second polymers at least one of which is soluble in an electrolyte such as 9N aqueous H$_2$SO$_4$, the polymer or the polymers of the mixture being chosen from among the following polymers: polyoxyethylene glycol, polyvinylpyrrolidone, polyacrylic acid, polymethacrylic acid, copolymers of acrylic and methacrylic acid, polyacrylates and polymethylacrylates of alkyl, and copolymers of acrylates and methacrylates of alkyl.

3. A membrane according to claim 2, prepared from a film which contains reticulated poly (2-hydroxyethylmethacrylate) obtained by photochemical polymerisation of the (2-hydroxyethylmethacrylate) in the presence of the said second polymer and said plasticizer.

4. A membrane according to claim 2, prepared from a film which contains reticulated poly (2 hydroxyethylmethacrylate) obtained by polymerising the (2 hydroxyethylmethacrylate) by ultra-violet radiation in the presence of a photosensitive promoter chosen from among the following substances: uranyl nitrate, uranyl acetate, benzoin, and anthraquinone-2-sodium sulfonate.

5. A membrane according to claim 1 prepared from a film reinforced by a felt or a permeable fabric.

6. A membrane according to claim 5, wherein the greater part of said reticulated poly (2 hydroxyethylmethracrylate) and said second polymer are in layer form on one side of the felt or the permeable fabric.

7. A membrane according to claim 1 and having the following properties:

an electrical resistance, determined in a 9N aqueous H$_2$SO$_4$ medium, of less than 150 $\mu$/cm$^2$ and preferably of less than 100 m$\Omega$/cm$^2$;

a permeability to antimony trioxide, determined in a 9N aqueous H$_2$SO$_4$ medium, of less than 0.2 mg/h-cm$^2$ and preferably less than 0.1 mg/h-cm$^2$;

a high chemical stability in a 9N aqueous and oxygenated H$_2$SO$_4$ medium; and a relative insensitivity of its mechanical properties to temperature and particularly to temperature lying between −20° C. and 70° C.

8. A lead-acid storage cell comprising a positive electrode, a negative electrode, a separator and a sulphuric acid electrolyte, characterized by the fact that the separator is at least partially constituted by a membrane according to claim 1.

* * * * *